United States Patent Office 2,725,746
Patented Dec. 6, 1955

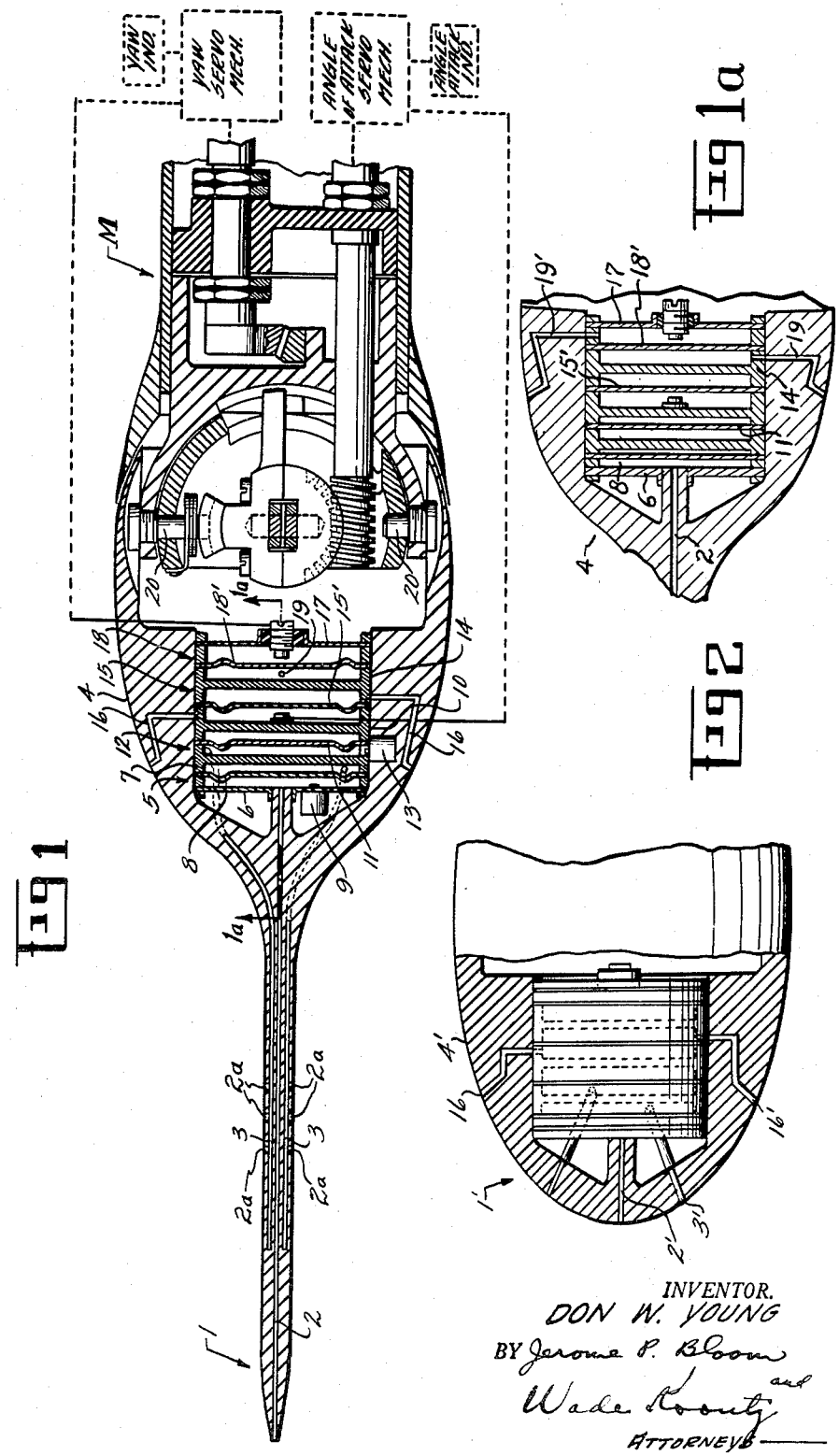

2,725,746

COMPOSITE SENSING HEAD AND CONTROL UNIT

Don W. Young, Dayton, Ohio

Application October 14, 1952, Serial No. 314,760

6 Claims. (Cl. 73—180)

(Granted under Title 35, U. S. Code (1952), sec. 266)

The invention described herein may be manufactured and used by or for the Government for governmental purposes without payment to me of any royalty thereon.

This invention relates to a new and novel aircraft instrument sensing head and control unit consisting of a null pressure type angle of attack and angle of yaw indicating and control unit incorporating a Pitot static "dynamic pressure" capsule and an altitude sensing capsule whereby the single improved unit provides angle of attack, angle of yaw, air speed and altitude information whereby control signals are obtained and transmitted with a substantial elimination of time lag and inaccuracy. The normal errors in Pitot and static pressure due to the inclination of the relative wind with respect to the axis of the Pitot static device are eliminated due to the universal mounting of the sensing head in conjunction with the servo mechanism which tends to align the longitudinal axis of the sensing head with the relative wind in the manner disclosed in my prior U. S. Patents Numbers 2,463,585 and 2,513,390 respectively. This new combination of my improved sensing head with an alignment mechanism therefor such as previously disclosed in my prior patents produces a composite sensing device of highly simplified form which has great utility and results in accuracy of control and data transmission which has not heretofore been equalled in devices previously constructed for similar purposes.

It is noted that the standard method of measuring Pitot static pressure on present airborne vehicles is to obtain Pitot pressure from the forward end of a tube which projects into the free airstream. The axis of such tube is usually fixed with respect to the axis of the aircraft. Static pressure is obtained from orifices positioned along the sides of the tube or in the skin of the aircraft. As the angle of attack or angle of yaw increases on either the Pitot static tube or aircraft fuselage there is an accompanying increase in error and inaccuracy of the Pitot and static pressure transmitted, particularly static pressure. These errors cause resulting errors in instruments and controls which are operated by the Pitot and static pressure, such as airspeed, altitude, rate of climb and Mach number indicating and control units. The basic reason for the resulting errors is the inherent inflexibility of the fixed Pitot static tube or the normal changes in pressure distribution on the skin of an aircraft.

The previous method devised to eliminate the undesirable effect of the fixed Pitot static tube employed a universally mounted Pitot static tube having vanes or shrouds thereon to align the tube with the relative wind. This method although satisfactory at subsonic speeds necessitates careful ground handling and is highly inadequate for general service, particularly at high speeds, due to its inherent flutter and vibration tendencies.

Moreover present Pitot static devices in use generally employ flexible tubing in the axis of rotation thereof which is apt to cause trouble in service.

My improved sensing head and control unit incorporating a Pitot static device, in conjunction with the servo mechanism to position the axis of the sensing head in line with the direction of relative wind, eliminates the normal poor response and flutter or inflexibility of the known Pitot static devices and by incorporating the airspeed capsule employed in the universally mounted sensing head the need for flexible tubing is eliminated. Likewise, as a result, by placing an altimeter capsule in the sensing head in combination with the Pitot static device an extremely accurate and simultaneous altitude indication or control is made possible.

The use of my sensing head and control unit provides a composite unit which, in addition to angle of attack and angle of yaw data transmission, instantaneously and simultaneously provides airspeed and altitude data transmission which is extremely accurate due to the provision of Pitot and static pressure free of error resulting from inclination of relative wind. Furthermore, my novel control unit being positioned by a powered servo system similar to that disclosed in my aforementioned patents provides a rugged unit with no flutter or vibration tendencies. An example of one of the problems which my novel control unit overcomes is one that occurs at the start of pitch maneuvers by an aircraft. It has been found with the Pitot static devices now in use that there is a momentary reverse reading of the altimeter at the start of pitch maneuvers due to transient airflow around the static vent. This confuses altitude control by the pilot as well as by the automatic pilot. My novel control unit was created to eliminate conditions such as this as well as many other similar control and indicating problems which have long harassed the aircraft industry.

An object of this invention is to provide a new and novel aircraft instrument sensing head and control unit incorporating a Pitot static device in conjunction with a servo mechanism which tends to align the longitudinal axis of the sensing head with the relative wind impinging thereon whereby a quicker and more accurate airspeed and altitude indication or control of an aircraft may be obtained.

A further object of this invention is to introduce a novel combination of a null pressure type angle of attack and angle of yaw indicator and control unit with a Pitot static "dynamic pressure" capsule and an altitude responsive capsule so arranged in single sensing head to produce a highly simplified unit which will provide the appropriate signals simultaneously to respective indicating instruments or control elements of an airborne vehicle with a corresponding reduction in time lag as well as an elimination of normal error due to misalignment of the longitudinal axis of the sensing unit with the respect to the direction of the relative wind.

An additional object of the invention is to provide an exceedingly compact miniaturized sensing head whereby a highly simplified and relatively inexpensive control mechanism obtains which provides the necessary control information to the pilot or automatic pilot of an airborne vehicle.

Other object and advantages will become readily apparent from the following description taken in conjunction with the accompanying drawings.

In the drawings Figure 1 shows a longitudinal vertical section view of the novel sensing unit diagrammatically related to its associated servo and control units. Figure 1a is a horizontal section taken on the line 1a—1a of Figure 1. Figure 2 shows a modified form of the novel sensing head.

The novel sensing head as shown in the drawings consists of a Pitot static tube 1 incorporating a Pitot passage 2. While the Pitot static device has been shown as a tube it may be formed in any suitable aerodynamic shape, for example, as formed in Figure 2 of the drawings, and need not necessarily protrude from the sensing head housing. In Fig. 2 parts corresponding to those of Fig. 1 are indicated by the same reference character with a prime attached. Thus the Pitot passage 2' of Fig. 2 terminates in a rounded head rather than a protruding tube as in Fig. 1. Static pressure orifices 2a in the Pitot static tube lead to static pressure passages 3 in a universally mounted housing 4 integral with the tube. A composite capsule is secured in the forward end of the housing 4 abutting the rear end of the Pitot passage 2. The forward side 6 of the composite capsule is open to the Pitot passage. The flanged panel member 7 with the element 6 forms an airspeed capsule 5. A diaphragm 8 is secured intermediate the elements 6 and 7. A static pressure passage 3 communicates with the rear chamber in the airspeed capsule 5 thus providing at any instant a "dynamic pressure" which is the differential pressure resulting from the application of Pitot pressure and static pressure to opposite sides of the diaphragm 8. A transducer 9 is connected to the airspeed capsule section, as shown, to measure the "dynamic pressure" which produces an electrical signal which is a function of said "dynamic pressure" to be transmitted by electrical means to an appropriate airspeed indicator or control element in the aircraft. The panel member 7 is common to both the airspeed capsule and the altimeter capsule. A flanged panel member 10 together with the member 7 has a diaphragm 11 secured therebetween and forms the altitude sensing section or altimeter capsule 12. A transducer 13 is connected to the altitude capsule, as shown diagrammatically in the drawings, for transmission of altitude and altitude changes to appropriate instruments or control devices. A flanged panel member 14 together with the flanged panel member 10 which is common to the altimeter capsule constitutes the angle of attack capsule 15. A diaphragm 15' is interposed intermediate the respective elements 10 and 14 to form two distinct chambers thereby. Symmetrically opposed ducts 16 and 16' in the housing 4 lead from the outer surface thereof into the opposite chambers of the angle of attack capsule on either side of the diaphragm 15'. The flanged panel member 14 is common to the angle of yaw capsule and with a rear closure means in the form of flanged panel 17 constitutes the angle of yaw capsule 18. Similarly as in each of the other capsule sections a diaphragm 18' is secured intermediate the elements 14 and 17. Passages 19 and 19' symmetrically and oppositely disposed in the housing 4 communicate with either side of diaphragm 18'. The housing 4 is pivotally secured by pivots 20 and universally mounted on the mounting unit M which extends from an aircraft and provides therefor a mounting similar to that shown in my previous U. S. Patent No. 2,513,390; likewise, the servo system utilized with the new and improved sensing head is similar to that employed in the aforementioned patent.

As disclosed in my U. S. Patent No. 2,513,390 the sensing unit is universally mounted and so related to the servo system utilized therewith and to the indicating units and control elements that the sensing head will sense the deviation of the longitudinal axis thereof from alignment with the relative wind and the servo unit will tend to re-align the sensing head with the relative wind in the manner set forth therein. To summarize the operation of my improved sensing head, the pressure of the relative wind aligned with the Pitot pressure passage is directed to the forward side of the diaphragm 8 while the static pressure is directed to the rear side thereof, as previously described, which produces a differential pressure which is the "dynamic pressure" resulting in a signal to the transducer unit which provides an electrical signal which is instantaneously transmitted to the airspeed indicator or appropriate speed control means in the aircraft. Since the mounting of the head aligns the Pitot pressure passage with the relative wind, any inaccuracy which normally obtains due to flutter or misalignment or inflexibility is eliminated as well as time lag. Simultaneously with the obtaining of the airspeed, in the manner indicated, the altimeter capsule section, one chamber of which has been sealed at standard temperature and pressure, is subjected to the same static pressure as the airspeed capsule in its other chamber. The resulting pressure differential therein is transmitted electrically by a transducer to its associated altimeter or appropriate altitude control means in the aircraft. This enables, as can be readily recognized, an instantaneous and highly accurate signal which provides altitude control as well as altitude indication upon transmission to the appropriate control means. Likewise, simultaneously, variation of the aircraft in yaw or pitch will result in a differential pressure in the angle of attack and the angle of yaw capsule which provides a sensing signal to the appropriate servo, which sensing signal is communicated in a manner described in my previous U. S. Patent No. 2,513,390 to the corresponding indicator or appropriate aircraft control means.

As can be readily seen I have developed a novel sensing head and control unit which at any particular instant may simultaneously transmit deviations in airspeed, altitude, angle of attack, and angle of yaw, all responsive to the same conditions, which provides a highly accurate indication or control of the performance of the aircraft facilitating the handling thereof. Moreover, the novel unit presents a distinct saving of material and a highly simplified compact arrangement resulting in easy maintenance and low costs.

The novel unit herein disclosed can easily be converted to provide an adequate Mach number in addition to the other control signals by incorporating a temperature sensing unit in the Pitot static head and interrelating such unit with the altitude and airspeed capsule to provide a composite signal resulting in an extremely accurate Mach number.

While a single practical embodiment of my novel sensing head and control unit has been shown and described, nothing herein should be so construed to limit the invention to the particular embodiment set forth since various modifications and applications thereof should be readily apparent to those skilled in the art and such lies within the scope of the appended claims.

I claim:

1. A pressure sensitive control unit adapted to be mounted for universal movement on an air-borne vehicle comprising, a housing having a static pressure passage therein, an altimeter having two opposed chambers, one of said chambers being in open communication with said static pressure passage and the other of said chambers being sealed at standard temperature and pressure; additional symmetrical and oppositely disposed pressure passages in said housing, pressure actuated angle of attack and angle of yaw measuring devices communicating respectively with said oppositely disposed pressure passages; said angle of attack and angle of yaw measuring devices being operatively connected to control a servo mechanism which causes the axis of the housing to continuously align itself with the directoin of relative wind impinging thereon, whereby said angle of attack and angle of yaw measuring devices provide housing deviation control and indicating signals simultaneously with the operation of said altimeter and in response to identical air conditions for substantial elimination automatically of time lag and error from simultaneous measurements of altitude, angle of attack and angle of yaw.

2. A pressure sensitive control unit adapted to be mounted for universal movement in an air-borne vehicle comprising, a housing having a Pitot static tube connected therewith, said tube having at least two orifices connecting respectively with a Pitot pressure passage and a static pressure passage in said tube, said passages communicating with a pressure actuated air-speed measuring device; additional symmetrical and oppositely disposed pressure passages in said housing, pressure actuated angle of attack and angle of yaw measuring devices communicating respectively with said oppositely disposed pressure passages; said angle of attack and angle of yaw measuring devices being operatively connected to control a servo mechanism which causes the axis of the housing to continuously align itself with the direction of relative wind impinging thereon, whereby said angle of attack and angle of yaw measuring devices provide housing deviation control and indicating signals simultaneously with the operation of said air speed indicator and in response to identical air conditions for substantial elimination automatically of time lag and error from simultaneous measurements of air-speed, angle of attack and angle of yaw.

3. A pressure sensitive control unit adapted to be mounted for universal movement on an air-borne vehicle comprising a housing and a Pitot static tube integral therewith, static pressure passages in said tube, a composite capsule mounted in said housing including an altimeter capsule section, an angle of attack capsule section and an angle of yaw capsule section; a pressure sensitive element in each of the sections forming relatively opposed chambers therein, a static pressure passage communicating with one of the chambers in the altimeter section, the other chamber being sealed at standard temperature and pressure; additional symmetrical and oppositely disposed pressure passages in said housing, opposed chambers in the angle of attack and angle of yaw sections communicating respectively with said oppositely disposed pressure passages; transducer and electrical signal transmitting means operatively connected to said angle of attack and angle of yaw sections, said signal transmitting means operating a servo mechanism which causes the axis of the housing to continuously align itself with the direction of relative wind impinging thereon and said servo mechanism simultaneously operating angle of attack and angle of yaw indicating devices, and further transducer and electrical signal transmitting means associated with said altimeter section of said capsule and operating an indicating device, whereby said angle of attack and angle of yaw measuring devices provide housing deviation control and indicating signals simultaneously with the operation of said altimeter and in response to identical air conditions for substantial elimination of time lag and error from simultaneous and instantaneous measurements of altitude, angle of attack and angle of yaw.

4. A pressure sensitive control unit adapted to be mounted for universal movement on an air-borne vehicle comprising a housing and a Pitot static tube integral therewith, a Pitot pressure passage and a static pressure passage in said tube; a composite capsule mounted in said housing including an air-speed capsule section, an angle of attack capsule section, and an angle of yaw capsule section; a pressure sensitive element in each of the sections forming relatively opposed chambers therein, said Pitot pressure and static pressure passages communicating respectively with each of the relatively opposed chambers in the air-speed capsule section, additional symmetrical and oppositely disposed pressure passages in said housing, opposed chambers in the angle of attack and angle of yaw sections communicating respectively with said oppositely disposed pressure passages; transducer and electrical signal transmitting means operatively connected to said angle of attack and angle of yaw sections, said signal transmitting means operating a servo mechanism which causes the axis of the housing to continuously align itself with the direction of relative wind impinging thereon, and said servo mechanism simultaneously operating angle of attack and angle of yaw indicating devices, and further transducer and electrical signal transmitting means associated with said air-speed section of said capsule and operating an indicating device; whereby said angle of attack and angle of yaw measuring devices provide housing deviation control and indicating signals simultaneously with the operation of said air speed indicator and in response to identical air conditions for substantial elimination automatically of time lag and error from simultaneous and instantaneous measurement of air-speed, angle of attack and angle of yaw.

5. Structure as in claim 4 including an altimeter capsule section having a pressure sensitive element arranged intermediate thereof providing two closed chambers, one open to a static pressure passage and the other sealed at standard temperature and pressure; and transducer and electrical signal transmitting means connected with said altimeter capsule section whereby a signal is provided for the corrected measurement of altitude simultaneously with air-speed, angle of attack and angle of yaw.

6. Structure as in claim 5 in which said Pitot static tube protrudes forwardly from said housing.

References Cited in the file of this patent

UNITED STATES PATENTS

| | | |
|---|---|---|
| 2,008,885 | Upson | July 23, 1935 |
| 2,445,335 | Philbrick et al. | July 20, 1948 |
| 2,458,022 | Phelps et al. | Jan. 4, 1949 |
| 2,513,390 | Young | July 4, 1950 |
| 2,554,634 | Paine et al. | May 29, 1951 |
| 2,662,402 | Ince et al. | Dec. 15, 1953 |